(12) United States Patent
Takayama et al.

(10) Patent No.: US 10,095,212 B2
(45) Date of Patent: Oct. 9, 2018

(54) MOTOR CONTROL APPARATUS CAPABLE OF PROTECTING PROCESS FACE AT THE TIME OF OCCURRENCE OF ABNORMAL LOAD

(71) Applicant: FANUC CORPORATION, Yamanashi (JP)

(72) Inventors: Kenichi Takayama, Yamanashi (JP); Zhiwei Tang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 23 days.

(21) Appl. No.: 15/499,141

(22) Filed: Apr. 27, 2017

(65) Prior Publication Data

US 2017/0235287 A1 Aug. 17, 2017

Related U.S. Application Data

(63) Continuation of application No. 14/661,034, filed on Mar. 18, 2015, now abandoned.

(30) Foreign Application Priority Data

Mar. 19, 2014 (JP) .................................. 2014-056956

(51) Int. Cl.
*G05B 19/048* (2006.01)
*B23Q 15/013* (2006.01)
(Continued)

(52) U.S. Cl.
CPC ......... *G05B 19/048* (2013.01); *B23Q 15/013* (2013.01); *B23Q 15/225* (2013.01);
(Continued)

(58) Field of Classification Search
CPC ............... B23Q 15/013; B23Q 15/225; B23Q 17/2208; G05B 2219/37025; G05B 2219/42289; G05B 2219/49147
(Continued)

(56) References Cited

U.S. PATENT DOCUMENTS 4,442,493 A 4/1984 Hideyuki et al.
4,723,219 A 2/1988 Beyer
(Continued)

FOREIGN PATENT DOCUMENTS

CN 1527170 A 9/2004
CN 102651546 A 8/2012
(Continued)

OTHER PUBLICATIONS

English Abstract and Machine Translation for German Publication No. 11 2011 105 361 T5, published Mar. 13, 2014, 13 pgs.
(Continued)

*Primary Examiner* — Michelle Lopez
(74) *Attorney, Agent, or Firm* — Fredrikson & Byron, P.A.

(57) ABSTRACT

A motor control apparatus controlling a motor driving a machine tool includes, an abnormal load detecting unit that detects an abnormal load by monitoring a load of the motor, a retract amount storing unit that stores a plurality of retract amounts used when the machine tool performs a retract operation in response to detection of an abnormal load by the abnormal load detecting unit, a retract amount switching unit that switches a retract amount selected from the plurality of retract amounts in accordance with a result of determination of whether the machine tool is processing or not, and a retract amount adding unit that adds a retract
(Continued)

amount selected by switching of the retract amount switching unit to an instruction value indicative of a movement amount of the machine tool.

5 Claims, 13 Drawing Sheets

(51) Int. Cl.
*B23Q 17/22* (2006.01)
*B23Q 15/22* (2006.01)

(52) U.S. Cl.
CPC .................. *B23Q 17/2208* (2013.01); *G05B 2219/37025* (2013.01); *G05B 2219/42289* (2013.01); *G05B 2219/49147* (2013.01)

(58) Field of Classification Search
USPC .......................................................... 173/2
See application file for complete search history.

(56) References Cited

U.S. PATENT DOCUMENTS

| 5,060,544 | A | 10/1991 | Hanaki et al. |
| 2013/0039707 | A1 | 2/2013 | Takayama |

FOREIGN PATENT DOCUMENTS

| DE | 3126276 | A1 | 3/1982 |
| DE | 112011105361 | T5 | 3/2014 |
| JP | 530628 | A | 2/1993 |
| JP | 36082346 | A | 3/1994 |
| JP | 07025006 | A | 1/1995 |
| JP | 2007219991 | A | 8/2007 |
| JP | 2011209936 | A | 10/2011 |
| JP | 5030628 | B2 | 9/2012 |
| JP | 5168352 | B2 | 3/2013 |
| JP | 2013153607 | A | 8/2013 |
| WO | 2009128156 | A1 | 10/2009 |

OTHER PUBLICATIONS

English Abstract and Machine Translation for German Publication No. 3126276 A1, published Mar. 11, 1982, 13 pgs.
English Abstract for Chinese Publication No. 102651546 A, published Aug. 29, 2012, 1 pg.
English Abstract for Chinese Publication No. 1527170 A, published Sep. 8, 2004, 1 pg.
English Abstract for Chinese Publication No. 05-030628 A, published Feb. 5, 1993, 1 pg.
English Translation of Japanese Publication No. 2011209936, published Oct. 20, 2011, 9 pgs.
English Translation of Japanese Publication No. 20133153607, published Aug. 8, 2013, 41 pgs.
English Translation of Abstract for WO Publication No. 2009/128156, published Oct. 22, 2009, 1 pg.
English Abstract for Japanese Publication No. 2007219991 A, published Aug. 30, 2007, 2 pgs.
English Abstract for Japanese Publication No. 07-025006 A, published Jan. 27, 1995, 1 pg.
English Abstract for Japanese Publication No. 5168352 B2, published Mar. 21, 2013, 2 pgs.
English Abstract for Japanese Publication No. 06-082346 A, published Mar. 22, 1994, 1 pg.
English Abstract for Japanese Publication No. 5030628 B2, published Sep. 19, 2012, 2 pgs.

FIG. 6A
FIG. 6B
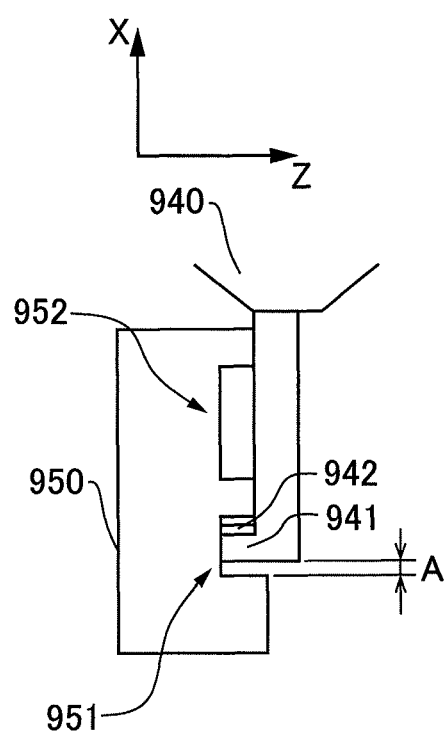
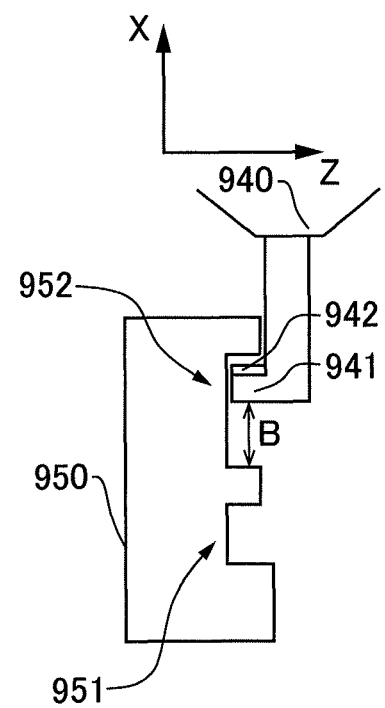

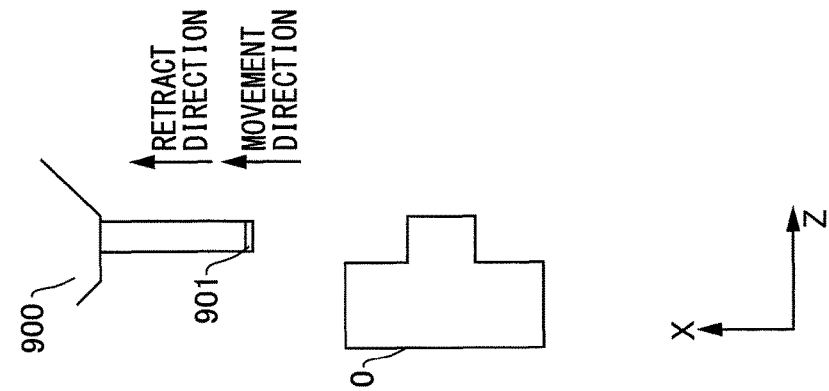
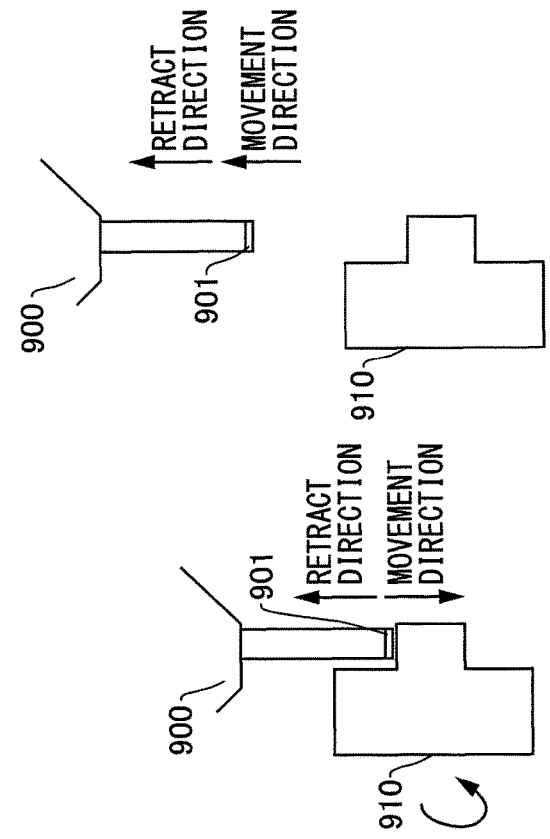

MOTOR CONTROL APPARATUS CAPABLE OF PROTECTING PROCESS FACE AT THE TIME OF OCCURRENCE OF ABNORMAL LOAD

CROSS REFERENCE TO RELATED APPLICATIONS

The present application is a continuation of application Ser. No. 14/661,034, filed Mar. 18, 2015, which claims priority to Japanese Application No. 2014-056956, filed Mar. 19, 2014, the entire disclosures of which are incorporated herein by reference.

BACKGROUND OF THE INVENTION

Field of the Invention

The present invention relates to a motor control apparatus capable of protecting a process face at the time of occurrence of an abnormal load.

Description of the Related Art

A machine tool includes motors along with drive axes, and the motors are driven and controlled by a motor control apparatus. For example, a motor is used for rotation of a tool or a workpiece and controlling contour trajectory. The motor control apparatus instructs and controls motor speed, torque, or the position of a rotor for the number of motors corresponding to the number of drive axes of a machine tool, the motor driving the drive axes.

FIGS. 12A to 12D are diagrams illustrating a process flow of a machine tool which cuts a workpiece. FIG. 12A is a diagram illustrating a state where a workpiece is disposed. FIG. 12B is a diagram illustrating a state where a cutter of the machine tool is moved from a housing position to a position close to the workpiece prior to processing. FIG. 12C is a diagram illustrating a state of processing of cutting the workpiece by the machine tool. FIG. 12D is a diagram illustrating a state where the cutter of the machine tool is moved from the position close to the workpiece to the housing position after the processing.

When a cutter 901 of a machine tool 900 moves from the state illustrated in FIG. 12A to the state illustrated in FIG. 12B or from the state illustrated in FIG. 12C to the state illustrated in FIG. 12D, a motor for moving the cutter 901 is controlled to move the cutter 901 at relatively high speed. On the other hand, in the state illustrated in FIG. 12C, to gradually move the cutter 901 while rotating a workpiece 910, the motor moving the cutter 901 is controlled to move the cutter 901 at relatively low speed.

When the movement of the cutter 901 is disturbed by collision of the cutter 901 of the machine tool 900 with another object or a failure occurs in a transmission mechanism during processing or non-processing of the workpiece 910, an excessive load is applied to the motor, which may result in the motor failing or a driven body may break.

To solve the problem, Japanese Laid-open Patent Publication No. 2007-219991 describes an abnormal load detecting apparatus for detecting an abnormal load applied on a motor for driving a driven body. The abnormal load detecting apparatus described in Japanese Laid-open Patent Publication No. 2007-219991 includes disturbance torque estimating means, speed comparing means, and torque comparing means. The disturbance torque estimating means estimates a disturbance toque applied to a motor, the speed comparing means compares the rotational speed of a motor with a predetermined reference speed, and the torque comparing means compares the disturbance torque estimated by the disturbance torque estimating means with a predetermined reference torque. In the abnormal load detecting apparatus described in Japanese Laid-open Patent Publication No. 2007-219991, when it is determined that the rotational speed of the motor exceeds the reference speed in the speed comparing means and it is determined that the disturbance torque is lower than the reference torque in the torque comparing means, occurrence of abnormality is determined.

Japanese Examined Patent Application Publication No. H07-25006 describes a tool retracting method of detecting the magnitude of a cutting load in each of process-axes directions, obtaining a cutting load direction applied to a workpiece by the ratio of process-axes directions components in the detected magnitudes of the cutting loads, and obtaining a tool retract relative position on the basis of the cutting load direction. In the tool retracting method described in Japanese Examined Patent Application Publication No. H07-25006, a tool retract instruction is generated on an opposite-direction vector to the obtained tool retract relative position, and a tool is automatically retracted in accordance with the generated tool retract instruction.

Japanese Patent Publication No. 5,168,352 describes a collision detecting apparatus provided with a drive motor, load current detecting means which detects load current in the drive motor, error detecting means which detects an error in the drive motor, and control means which controls driving of the drive motor. In the collision detecting apparatus described in Japanese Patent Publication No. 5,168,352, the control means determines whether a driving apparatus for the drive motor is processing or not. Subsequently, on the basis of the determination result, the control means sets a load current setting value indicating a reference current value for determining a collision between a structure provided with the drive motor and an object to be processed and a motor current limit value for limiting the motor current so that a motor output torque of the drive motor becomes equal to or less than a predetermined value. During processing, the control means limits the load current detected by the load current detecting means becomes equal to or less than the motor current limit value set to be equal to or larger than the load current setting value and detects a collision when the load current becomes equal to or larger than the load current setting value. During non-processing, when the load current detected by the load current detecting means becomes equal to or larger than the motor current limit value which is set to be equal to or less than the load current setting value, the control means determines an error detected by the error detecting means, thereby detecting a collision.

However, since the speed of moving the cutter 901 during processing the workpiece 910 and the speed of moving the cutter 901 during non-processing are different from each other, there is a problem that the flow amount that the cutter 901 moves varies since the machine tool 900 detects a collision until a retract operation is started.

FIG. 13 is a diagram illustrating the relation between the flow amount of movement of the cutter 901 since the machine tool 900 detects a collision until a retract operation is started and the retract amount of retract of the cutter 901 by the retract operation. In FIG. 13, the horizontal axis indicates time, and the vertical axis indicates a position change in the movement direction. In FIG. 13, the solid line indicates movement of the cutter 901 when a collision is detected during processing and the broken line indicates movement of the cutter 901 when a collision is detected during non-processing. "A" denotes a position where a collision is detected during processing, "B" denotes a position where the retract operation is started when a collision is detected during processing, and "C" indicates a position of retract when a collision is detected during processing. A' denotes a position where a collision is detected during non-processing, B' denotes a position where the retract operation is started when a collision is detected during non-processing, and C' indicates a position of retract when a collision is detected during non-processing.

A flow amount X[m] is expressed by the following Equation (1) from movement speed F[m/s] of the cutter 901 and delay time T[s] since a collision is detected until a retract operation is started.

$$X = F \times T \quad \text{Equation (1)}$$

For example, when the movement speed of the cutter 901 is 1000 [mm/s] and the delay time is 1 [ms], the flow amount X becomes 1 mm. The larger the flow amount is, the more the cutter 901 proceeds toward the collision direction, and there is the possibility that breakage of the machine tool 900 becomes severe.

In the machine tool 900, the flow amount during non-processing becomes larger than the flow amount during processing. However, in the machine tool 900, the same retract amount is used during processing and during non-processing even though the flow amount varies. Consequently, when a collision is detected during non-processing in which the flow amount is relatively large, there is the possibility that the retract amount is insufficient and the machine tool 900 may break. On the other hand, when a sufficiently large retract amount is assured to protect the machine tool 900, a situation where the cutter may not be retracted may occur during processing.

FIG. 14 is a diagram illustrating an example that retract is not easy during processing of a workpiece.

A machine tool 920 includes a cutter supporting unit 921 and a cutter 922 disposed on the top face of the cutter supporting unit 921 in order to cut the upper wall of a recess in a workpiece 930. The machine tool 920 makes the cutter 922 come close to the inner wall of the recess in the workpiece 930 and gradually moves the cutter supporting unit 921 upward to cut the inner wall of the recess in the workpiece 930.

In the machine tool 920, the difference between the width of the recess in the workpiece 930 and the height of the cutter supporting unit 921 is a distance which can be assured as a retract amount. In the machine tool 920, when the retract amount is larger than the difference between the width of the recess in the workpiece 930 and the height of the cutter supporting unit 921, there is the possibility that the workpiece 930 or the machine tool 920 may break.

In the Japanese Laid-open Patent Publication No. 2007-219991, although a method of detecting an abnormal load is presented, a measure for preventing a process face from being damaged when an abnormal load is detected is not described. In Japanese Examined Patent Application Publication No. H07-25006, although a method of detecting an abnormal load and a retract method when a cutting failure occurs are described, a measure against the case that retract may not be performed when a cutting failure occurs is not described. In Japanese Patent Publication 5,168,352, although it is described that whether a driving apparatus for a motor is processing or not is determined, and on the basis of a result of the determination, a collision is detected, retract when a collision is detected is not described.

SUMMARY OF THE INVENTION

In view of the above-described problems, an object of the present invention is to provide a motor control apparatus capable of protecting different protection objects such as protection of a machine during non-processing and protection of a workpiece during processing.

To achieve the object, a motor control apparatus controlling a motor driving a machine tool includes, an abnormal load detecting unit that detects an abnormal load by monitoring a load of the motor, a retract amount storing unit that stores a plurality of retract amounts used when the machine tool performs a retract operation in response to detection of an abnormal load by the abnormal load detecting unit, a retract amount switching unit that switches a retract amount selected from the plurality of retract amounts in accordance with a result of determination of whether the machine tool is processing or not, and a retract amount adding unit that adds a retract amount selected by switching of the retract amount switching unit to an instruction value indicative of a movement amount of the machine tool, and a retract amount selected when it is determined that processing is being made and a retract amount selected when it is determined that processing is not being made are switched.

In the above-described mode, the retract amount switching unit may switch a retract amount to be selected in accordance with a mode signal input from a host controller.

In the above-described mode, the retract amount switching unit may switch a retract amount to be selected in accordance with a switch signal input from an external device.

In the above-described mode, a retract amount to be selected when it is determined that the machine tool is processing may be rewritten in accordance with a process program used.

In the above-described mode, a retract amount selected when it is determined that the machine tool is processing may be rewritten in accordance with a process state of a workpiece which is processed by the machine tool.

BRIEF DESCRIPTION OF DRAWINGS

The present invention will be understood more clearly with reference to the following appended drawings, in which:

FIG. 6A is a diagram illustrating an example of a process of a machine tool to which the motor control system illustrated in FIG. 4 is applied;

FIG. 6B is a diagram illustrating another example of the process of the machine tool to which the motor control system illustrated in FIG. 4 is applied;

FIGS. 12A to 12D are diagrams illustrating a process flow of a machine tool which cuts a workpiece; FIG. 12A is a diagram illustrating a state where a workpiece is disposed, FIG. 12B is a diagram illustrating a state where a cutter of the machine tool is moved from a housing position to a position close to the workpiece prior to processing, FIG. 12C is a diagram illustrating a process state of cutting the workpiece by the machine tool, and FIG. 12D is a diagram illustrating a state where the cutter of the machine tool is moved from the position close to the workpiece to the housing position after the processing;

DETAILED DESCRIPTION

Figure 1:
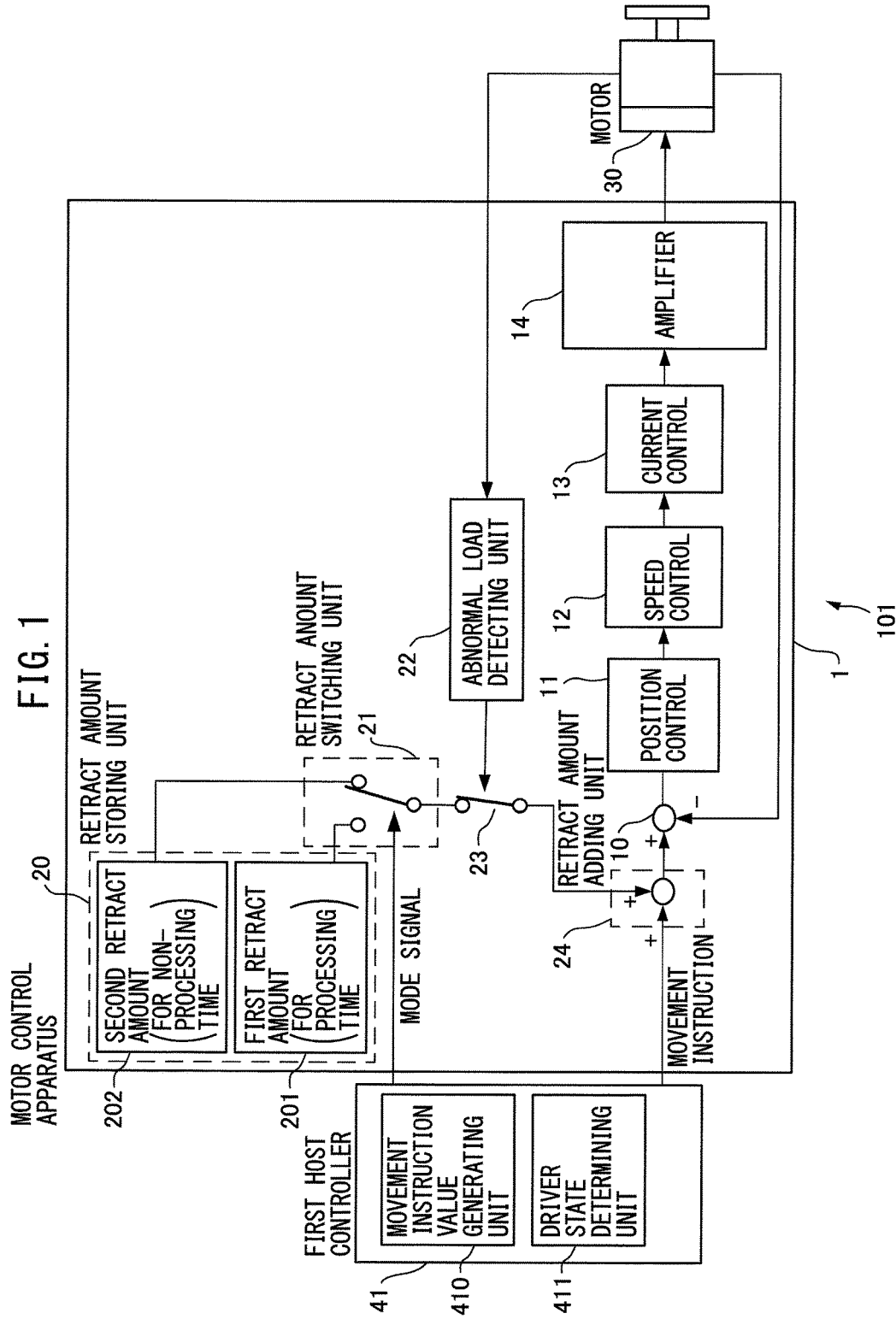
FIG. 1 is a block diagram illustrating a motor control system according to a first embodiment.

In the following, by referring to the drawings, a motor control apparatus according to the present invention will be described with first to fifth embodiments. However, it is to be understood that the present invention is not limited to the drawings and embodiments illustrated below.

FIG. 1 is a block diagram illustrating a motor control system including a motor control apparatus according to a first embodiment. Hereinbelow, it is assumed that components to which the same reference numerals are designated in different drawings have the same function.

A motor control system 101 according to a first embodiment includes a motor control apparatus 1, a motor 30, and a first host controller 41. The motor control apparatus 1 includes a position deviation generating unit 10, a position control unit 11, a speed control unit 12, a current control unit 13, an amplifier 14, a retract amount storing unit 20, a retract amount switching unit 21, an abnormal load detecting unit 22, a retract amount switch 23, and a retract amount adding unit 24.

A movement instruction output from the first host controller and a retract amount output from the retract amount storing unit 20 are added by the retract amount adding unit 24 to generate a movement instruction. Further, a position deviation generated from the difference between the movement instruction and motor position information output from the motor 30 is output to the position control unit 11. The position control unit 11 generates a speed instruction value on the basis of the position deviation and outputs the generated speed instruction value to the speed control unit 12. The speed control unit 12 generates a current instruction value from the speed instruction value input from the position control unit 11 and the motor speed information output from the motor 30 and outputs the generated current instruction value to the current control unit 13. The current control unit 13 generates a drive instruction for driving the amplifier 14 from the current instruction value input from the speed control unit 12 and the motor current information output from the motor 30, and outputs the generated drive instruction to the amplifier 14. The amplifier 14 is, for example, an inverter for converting DC power to AC power by switching operation of a switching element provided on the inside. The amplifier 14 controls the switching operation of the switching element in the amplifier 14 by a received drive instruction to control a converting operation of converting the DC power to the AC power for driving the motor 30.

The retract amount storing unit 20 is a storing device capable of storing a plurality of retract amounts, and stores a first retract amount 201 and a second retract amount 202 whose value is different from the first retract amount 201. The first retract amount 201 is a retract amount used at the time of processing, and the second retract amount 202 is a retract amount used at the time of non-processing.

Figure 14:
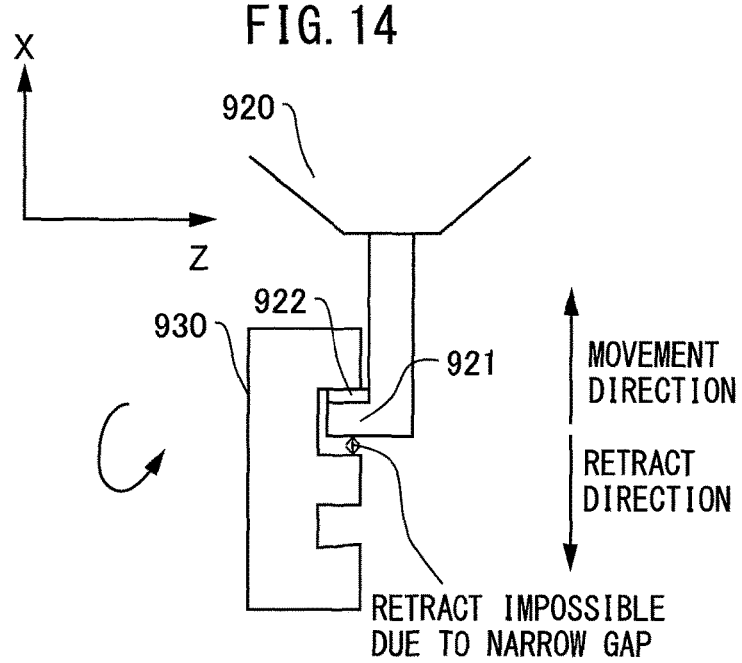
FIG. 14 is a diagram illustrating an example that retract is not easy during a workpiece is being processed.

The first retract amount 201 is an amount suitable to protect a workpiece which is processed by a driver driven by the motor 30. When the motor 30 drives a cutter supporting unit 921 which supports a cutter 922 cutting the inner walls of recesses in a workpiece 930 illustrated in FIG. 14, the distance shorter than the difference between the width of a recess in the workpiece 930 and the height of the cutter supporting unit 921 is the distance of the first retract amount 201.

The second retract amount 202 is an amount suitable to protect a machine tool including the motor 30 and a driver driven by the motor 30. When the motor 30 drives a cutter 901 cutting the top face of a workpiece 910 illustrated in FIGS. 12A to 12D, a distance of compensating a flow amount X[m] computed by Equation (1) from a movement speed F[m/s] when the cutter 901 moves and delay time T[s] is the first retract amount 201.

To the retract amount switching unit 21, a mode signal indicating whether the drive unit driven by the motor 30 is processing or not is supplied from the first host controller 41. The retract amount switching unit 21 selects either the first retract amount 201 or the second retract amount 202 stored in the retract amount storing unit 20 on the basis of the mode signal supplied from the first host controller 41.

The abnormal load detecting unit 22 monitors the load of the motor 30 and detects an abnormal load. For example, when motor current information output from the motor 30 is smaller than a predetermined threshold, the abnormal load detecting unit 22 determines that the load of the motor 30 is normal. When the motor current information output from the motor 30 is larger than the predetermined threshold, the abnormal load detecting unit 22 determines that the load of the motor 30 is abnormal. When it is determined that the load of the motor 30 is abnormal, the abnormal load detecting unit 22 outputs motor load abnormal information indicating that the load of the motor 30 is abnormal is output to the retract amount switch 23 and the first host controller 41.

When the motor load abnormal information is not input from the abnormal load detecting unit 22, the retract amount switch 23 enters an off state and outputs zero. When the motor load abnormal information is input from the abnormal load detecting unit 22, the retract amount switch 23 enters an on state and outputs either the first retract amount 201 or the second retract amount 202 selected by the retract amount switching unit 21 to the retract amount adding unit 24.

The retract amount adding unit 24 is an adder adding the movement instruction value supplied from the first host controller 41 and the value supplied from the retract amount switch 23. When the retract amount switch 23 is in the off state, the retract amount adding unit 24 outputs the movement instruction value supplied from the first host controller 41 as a movement instruction value to the position deviation generating unit 10. When the retract amount switch 23 is in the on state, the retract amount adding unit 24 outputs a value obtained by adding the retract amount supplied from the retract amount switch 23 to the movement instruction value supplied from the first host controller 41 as a movement instruction value. When the retract amount switching unit 21 selects the first retract amount 201 and the retract amount switch 23 is in the on state, the retract amount adding unit 24 outputs the value obtained by adding the first retract amount 201 to the movement instruction value supplied from the first host controller 41 as a movement instruction value to the position deviation generating unit 10. When the retract amount switching unit 21 selects the second retract amount 202 and the retract amount switch 23 is in the on state, the retract amount adding unit 24 outputs the value obtained by adding the second retract amount 202 to the movement instruction value supplied from the first host controller 41 as a movement instruction value to the position deviation generating unit 10.

The motor 30 drives a driver of a not-illustrated machine tool in accordance with AC power output from the amplifier 14. The motor 30 includes a motor position detector detecting the position of the motor 30, a motor speed detector detecting the speed of the motor 30, and a motor current detector detecting current of the motor 30. The motor 30 outputs motor position information detected by the motor position detector to the position deviation generating unit 10, and outputs motor speed information detected by the motor speed detector to the speed control unit 12. The motor 30 outputs motor current information detected by the motor current detector to the current control unit 13. For position feedback, a detector of a separate placement type may be used.

The first host controller 41 includes a movement instruction value generating unit 410 and a driver state determining unit 411. The movement instruction value generating unit 410 generates a movement instruction value indicative of a movement amount of the position of the driver driven by the motor 30, and outputs the generated movement instruction value to the retract amount adding unit 24. The driver state determining unit 411 determines whether the driver driven by the motor 30 is processing or not and outputs a mode signal indicative of a determination result to the retract amount switching unit 21.

Figure 2:
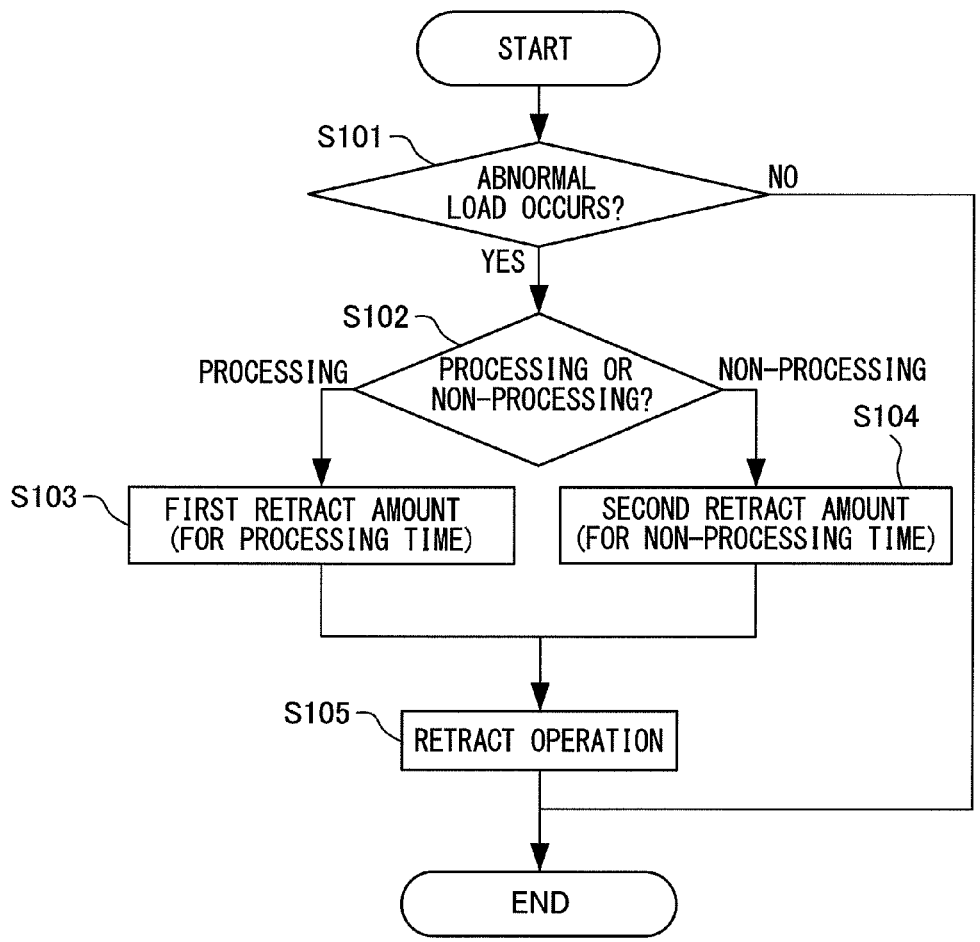
FIG. 2 is a flowchart illustrating a process flow of the motor control system illustrated in FIG. 1.

FIG. 2 is a flowchart illustrating a process flow of the motor control system 101.

In step S101, the abnormal load detecting unit 22 compares, for example, motor current information output from the motor 30 with a predetermined threshold. When it is determined that the motor current information output from the motor 30 is smaller than a predetermined threshold, the abnormal load detecting unit 22 determines that the load of the motor 30 is normal and an abnormal load is not generated, and the process is finished. When it is determined that the motor current information output from the motor 30 is larger than the predetermined threshold, the abnormal load detecting unit 22 determines occurrence of load abnormality in the motor 30, and outputs motor load abnormality information to the retract amount switch 23 and the first host controller 41. When the motor load abnormality information is supplied, the retract amount switch 23 enters an on state and connects the retract amount switching unit 21 and the retract amount adding unit 24.

Subsequently, in step S102, the first host controller 41 to which the motor load abnormal information is supplied determines whether the driver driven by the motor 30 is processing or not and outputs a mode signal indicative of the determination result to the retract amount switching unit 21.

When a mode signal indicating that the driver driven by the motor 30 is processing is received, the process proceeds to step S103. When a mode signal indicating that the driver driven by the motor 30 is not processing is received, the process proceeds to step S104.

When the process proceeds to step S103, the retract amount switching unit 21 is switched to select the first retract amount 201. Since the retract amount switching unit 21 selects the first retract amount 201 and the retract amount switch 23 is in the on state, the retract amount adding unit 24 outputs a value obtained by adding the first retract amount 201 to the movement instruction value which is supplied from the first host controller 41 as a movement instruction value.

When the process proceeds to step S104, the retract amount switching unit 21 is switched to select the second retract amount 202. Since the retract amount switching unit 21 selects the second retract amount 202 and the retract amount switch 23 is in the on state, the retract amount adding unit 24 outputs a value obtained by adding the second retract amount 202 to the movement instruction value which is supplied from the first host controller 41 as a movement instruction value.

Subsequently, in step S105, the position deviation generating unit 10, the position control unit 11, and the speed control unit 12 generate position feedback information, a speed instruction value, and a current instruction value, respectively, by using the movement instruction value to which the retract amount is added in the retract amount adding unit 24. The current control unit 13 generates a drive instruction by using the current instruction value generated by the speed control unit 12. The amplifier 14 drives the motor 30 in response to the drive instruction based on the movement instruction value generated by the current control unit 13 to make the driver driven by the motor 30 retract. When the driver driven by the motor 30 is processing and the first retract amount 201 is added by the retract amount adding unit 24, the motor 30 makes the driver retract only by a distance corresponding to the first retract amount 201. When the driver driven by the motor 30 is not processing and the second retract amount 202 is added by the retract amount adding unit 24, the motor 30 makes the driver retract only by a distance corresponding to the second retract amount 202.

When the driver driven by the motor 30 comes out from an abnormal state such as collision by making the driver retract, the motor current information detected by the motor current detecting unit of the motor 30 becomes smaller than the predetermined threshold. When the motor current information becomes smaller than the predetermined threshold, the abnormal load detecting unit 22 determines that the load of the motor 30 is normal and stops outputting the motor load abnormal information, and the retract amount switch 23 is turned off. When the retract amount switch 23 is turned off, the retract amount adding unit 24 outputs, as a movement instruction value, a movement instruction value supplied from the first host controller 41.

In the motor control system 101, when the current of the motor 30 becomes larger than the predetermined threshold, occurrence of an abnormal state such as a collision in the driver driven by the motor 30 is determined, and when the driver is retracted, whether the driver is being processing or not is determined. When it is determined that the driver is processing, the motor control system 101 makes the driver retract only by the distance corresponding to the first retract amount 201. When it is determined that the driver is not processing, the motor control system 101 makes the driver retract only by the distance corresponding to the second retract amount 202 which is different from the first retract amount. Since the motor control system 101 can set a retract amount suitable to each of the case that the driver is processing and the case where the driver is not processing, different protection objects such as a machine during the non-processing state and a workpiece during the processing state can be protected.

Figure 3:
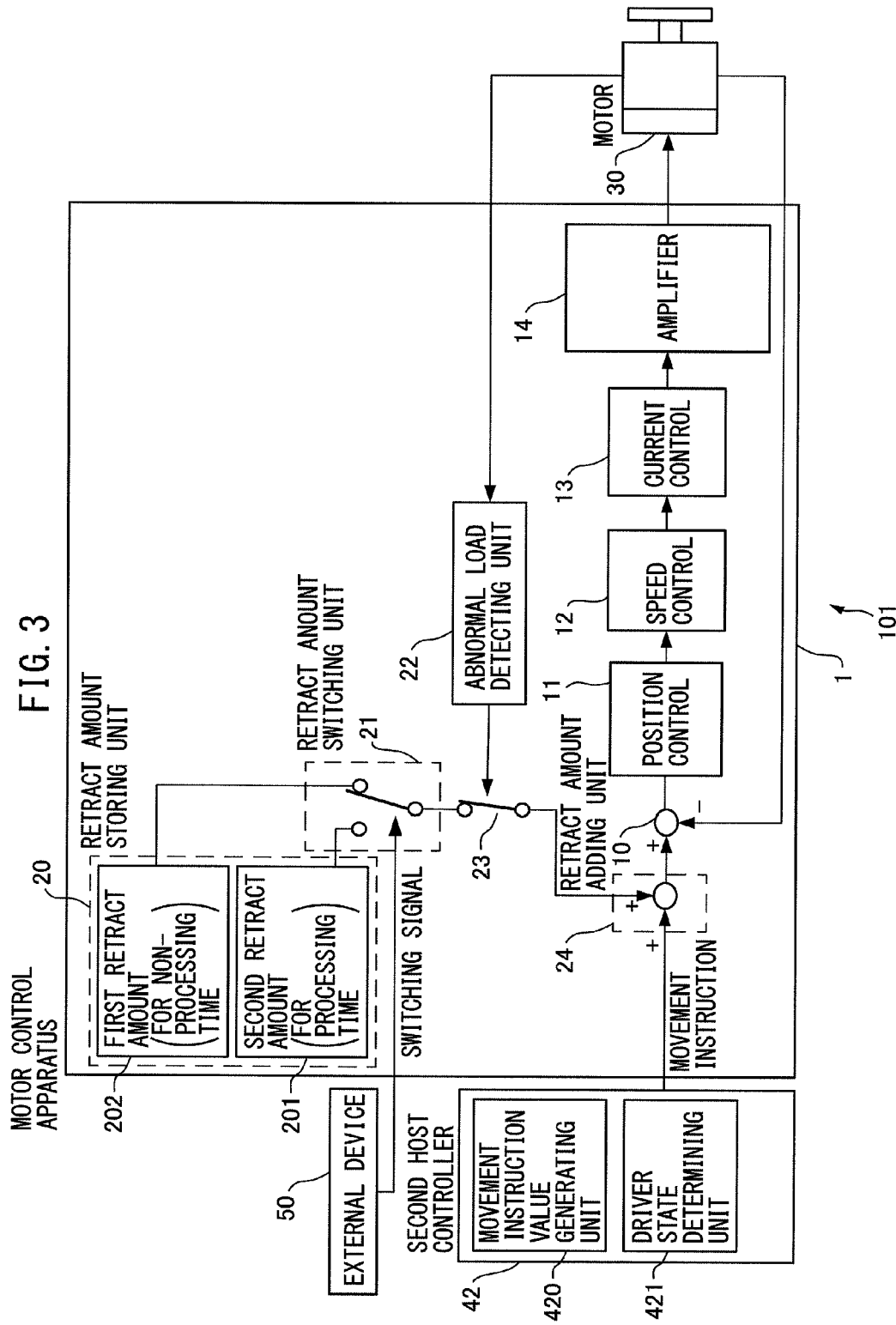
FIG. 3 is a block diagram illustrating a motor control system according to a second embodiment.

FIG. 3 is a block diagram illustrating a motor control system according to a second embodiment.

A motor control system 102 according to the second embodiment is different from the motor control system 101 that an external device 50 is disposed. The motor control system 102 is also different from the motor control system 101 that a second host controller 42 is disposed in place of the first host controller 41.

The external device 50 generates a switch signal on the basis of the status and the like of devices other than the driver driven by the motor 30 and outputs the generated switch signal to the retract amount switching unit 21. The retract amount switching unit 21 selects either the first retract amount 201 or the second retract amount 202 stored in the retract amount storing unit 20 on the basis of the switching signal supplied from the external device 50.

The second host controller 42 includes a movement instruction value generating unit 420. Similar to the movement instruction value generating unit 410, the movement instruction value generating unit 420 generates a movement instruction value indicative of a movement amount of the position of the driver driven by the motor 30 and outputs the generated movement instruction value to the retract amount adding unit 24. The second host controller 42 is different from the first host controller 41 that it does not have a function of determining whether the driver driven by the motor 30 is processing or not and the mode signal is not output to the retract amount switching unit 21.

In the motor control system 102, the retract amount switching unit 21 is switched by using the switch signal generated by the external device 50 on the basis of the situation and the like of the device other than the driver driven by the motor 30, so that the retract amount can be selected on the basis of wider conditions, and a machine tool can be protected more reliably.

Figure 4:
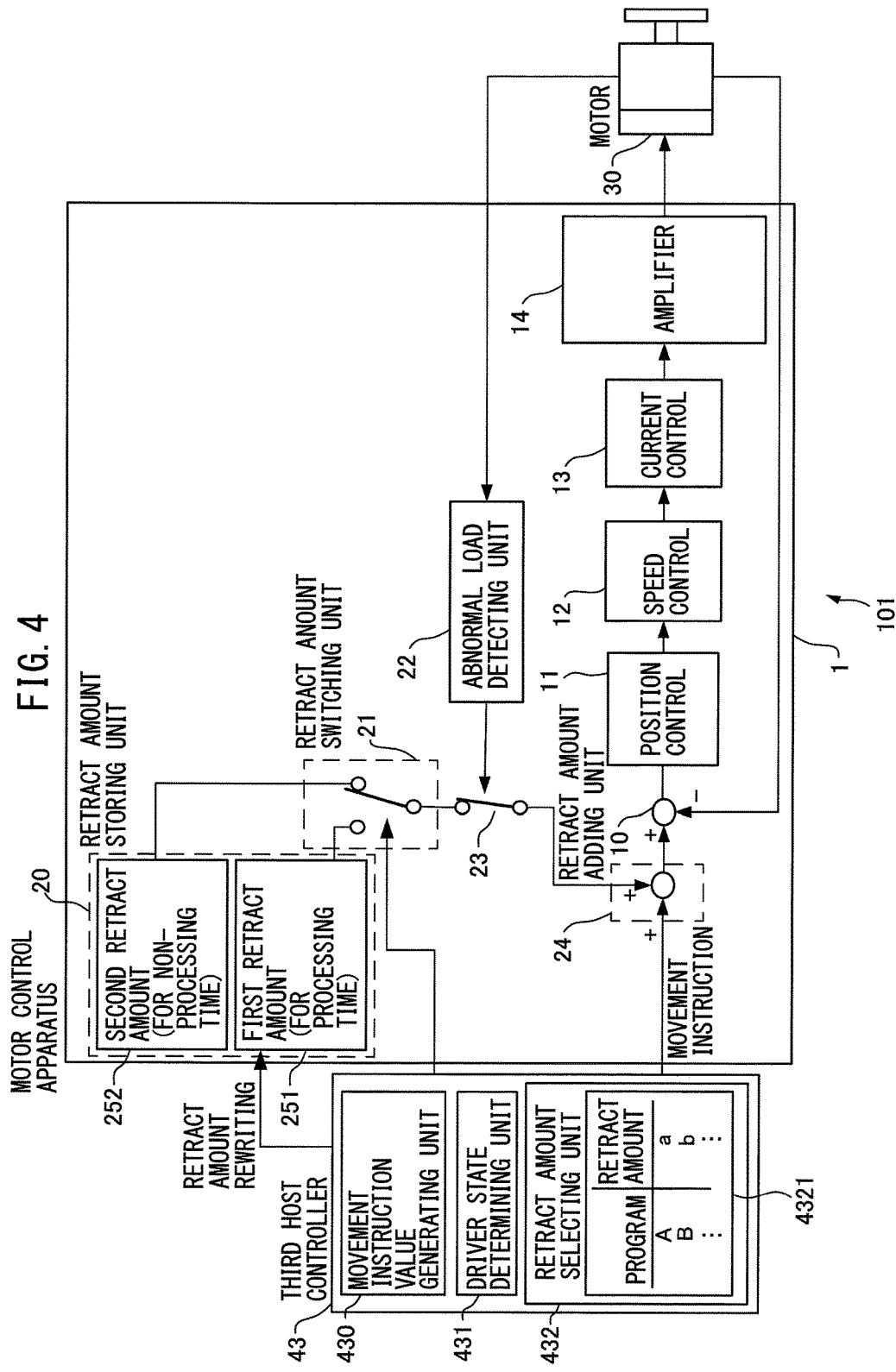
FIG. 4 is a block diagram illustrating a motor control system according to a third embodiment.

FIG. 4 is a block diagram illustrating a motor control system including a motor control apparatus according to a third embodiment.

A motor control system 103 according to a third embodiment is different from the motor control system 101 that a motor control apparatus 3 is disposed in place of the motor control apparatus 1. The motor control apparatus 103 is different from the motor control apparatus 101 that a third host controller 43 is disposed in place of the first host controller 41.

The motor control apparatus 3 is different from the motor control apparatus 1 that a retract amount storing unit 25 is disposed in place of the retract amount storing unit 20.

The retract amount storing unit 25 is a storing device capable of storing a plurality of retract amounts, and includes a storage area in which a stored retract amount is rewritable by the third host controller 43 during execution of a processing program, and a storage region in which a stored retract amount is not rewritable. The retract amount storing unit 25 stores a first retract amount 251 as a retract amount used at the time of processing and a second retract amount 252 as a retract amount used at the time of non-processing. The first retract amount 251 is stored in a rewritable storage area in the retract amount storing unit 25. The second retract amount 252 is stored in a non-rewritable storage area in the retract amount storing unit 25.

The third host controller 43 includes a movement instruction value generating unit 430, a driver state determining unit 431, and a retract amount selecting unit 432. The movement instruction value generating unit 430 has a function similar to that of the movement instruction value generating unit 410, and the driver state determining unit 431 has a function similar to that of the driver state determining unit 411.

The retract amount selecting unit 432 includes, for example, a retract amount determination table 4321 specified for each processing program used by a retract amount used. When the processing program used is changed, the retract amount selecting unit 432 selects a retract amount according to the changed processing program with reference to the retract amount determination table 4321 and writes the selected retract amount into the first retract amount 251. For example, when the processing program used is changed to a program A, a retract amount a specified as a retract amount used for the program A is selected, and the selected retract amount a is written in the first retract amount 251. When the processing program used is changed to a program B, a retract amount b specified as a retract amount used for the program B is selected, and the selected retract amount b is written in the first retract amount 251.

Figure 5:
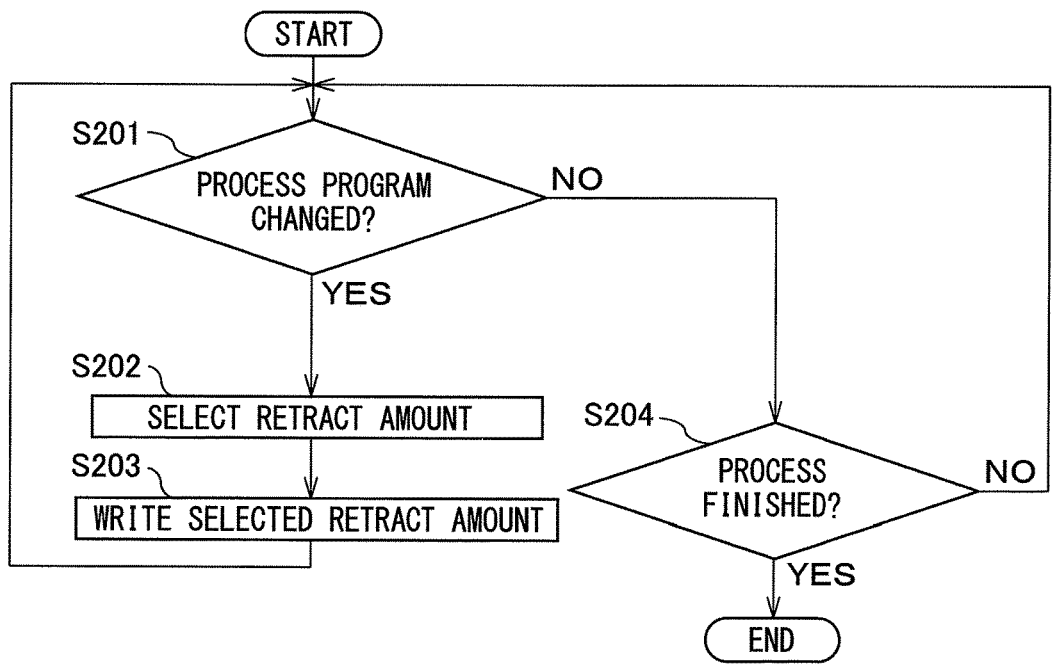
FIG. 5 is a flowchart illustrating a process flow of the motor control system illustrated in FIG. 4.

FIG. 5 is a flowchart illustrating a process flow of the retract amount selecting unit 432 in the motor control system 103.

First, in step S201, the retract amount selecting unit 432 determines whether the processing program used is changed or not. When it is determined that the processing program used is changed, the process proceeds to step S202. When it is determined that the processing program used is not changed, the process proceeds to step S204.

When the process proceeds to step S202, the retract amount selecting unit 432 selects a retract amount corresponding to the changed processing program with reference to the retract amount determination table 4321.

In step S203, by writing the retract amount selected in step S202 to the first retract amount 251, the retract amount selecting unit 432 rewrites the retract amount selected in step S202 with a retract amount according to the processing program used. Subsequently, the process returns to step S201.

When the process proceeds to step S204, the retract amount selecting unit 432 determines whether the processing process is finished or not. When it is determined that the processing process is not finished, the process returns to step S201. The retract amount selecting unit 432 repeats the process in steps S201 to S204 until it is determined in step S204 that the processing process is finished. When it is determined that the processing process is finished, the flow is terminated.

In the motor control system 103, the retract amount is rewritten according to a processing program used. Consequently, a retract amount according to the shape or the like of a workpiece to be processed can be selected, so that a workpiece being processed can be protected more reliably.

FIG. 6A is a diagram illustrating an example of a process of a machine tool to which the motor control system 103 is applied, and FIG. 6B is a diagram illustrating another example of the process of the machine tool to which the motor control system 103 is applied. More specifically, FIG. 6A is a diagram that the upper wall of a first recess 951 in a workpiece 950 is cut, and FIG. 6B is a diagram that the upper wall of a second recess 952 in the workpiece 950 is cut.

A machine tool 940 includes a cutter supporting unit 941 and a cutter 942 disposed on the top face of the cutter supporting unit 941 to cut the upper wall of the recess in the workpiece 950. Since the widths of the first recess 951 and that of the second recess 952 are different from each other, the retract amount when the machine tool 940 makes the cutter 942 retract in a processing program for cutting the first recess 951 and that in a processing program for cutting the second recess 952 are different. In the processing program for cutting the first recess 951, it is sufficient that the retract amount is shorter than a distance A indicative of the difference between the width of the first recess 951 and the height of the cutter supporting unit 941 and the cutter 942. In the processing program for cutting the second recess 952, it is sufficient that the retract amount is shorter than a distance B indicative of the difference between the width of the second recess 952 and the height of the cutter supporting unit 941 and the cutter 942. By setting the retract amount at the time of using the processing program for cutting the second recess 952 to be larger than the retract amount at the time of using the processing program for cutting the first recess 951, the workpiece 950 can be protected more reliably.

Figure 7:
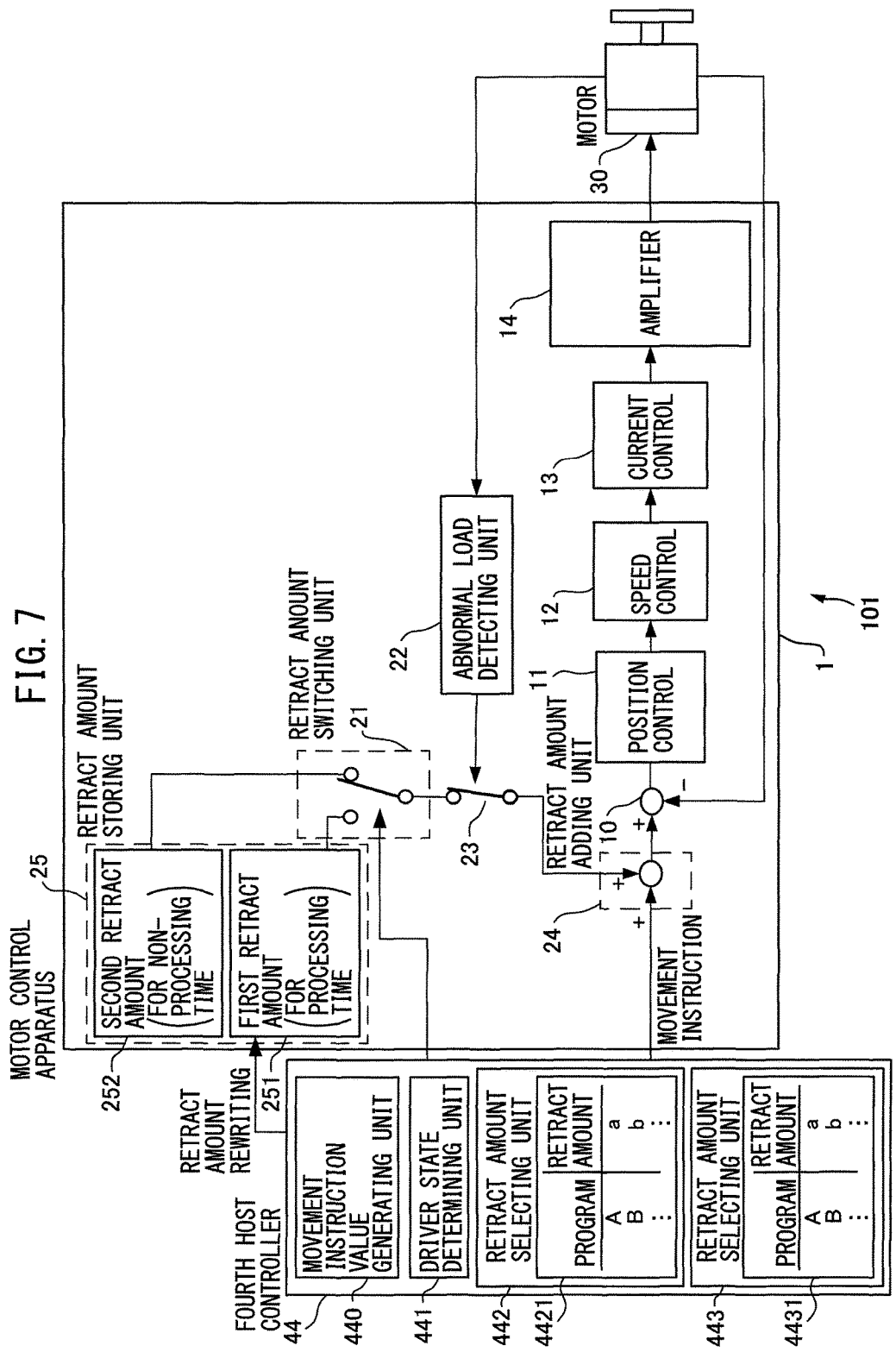
FIG. 7 is a block diagram illustrating a motor control system according to a fourth embodiment.

FIG. 7 is a block diagram illustrating a motor control system including a motor control apparatus according to a fourth embodiment.

A motor control system 104 according to a fourth embodiment is different from the motor control system 103 that a fourth host controller 44 is disposed in place of the third host controller 43.

The fourth host controller 44 includes a movement instruction value generating unit 440, a driver state determining unit 441, a retract amount selecting unit 442, and a retract amount computing unit 443. The movement instruction value generating unit 440, the driver state determining unit 441, and the retract amount selecting unit 442 have functions similar to those of the movement instruction value generating unit 430, the driver state determining unit 431, and the retract amount selecting unit 432, respectively.

The retract amount computing unit 443 includes a movement speed table 4431 specified for each processing program in which movement speed F[m/s] of the driver is used. When a process of a workpiece is started, the retract amount computing unit 443 computes a movement distance L[m] of the driver from the movement speed F[m/s] of the driver and time T[s] lapsed since the process of the workpiece is started. At the time of computing the movement distance L[m] of the driver, the retract amount computing unit 443 refers to the movement speed table 4431. For example, when a processing program used is the program A, movement speed $\alpha$ specified as the movement speed F[m/s] used for the program A is selected, and the selected movement speed $\alpha$ is computed as the movement speed F[m/s] of the driver. When a processing program used is the program B, movement speed $\beta$ specified as the movement speed F[m/s] used for the program B is selected, and the selected movement speed $\beta$ is computed as the movement speed F[m/s] of the driver. Subsequently, the retract amount computing unit 443 compares the computed movement distance L[m] with a retract amount selected from the retract amount determination table 4321. When the movement distance L[m] is smaller than the retract amount selected from the retract amount determination table, the movement distance L[m] is set as a retract amount. When the movement distance L[m] is equal to or larger than the retract amount selected from the retract amount determination table, the retract amount selected from the retract amount determination table is written as the first retract amount 251.

Figure 8:
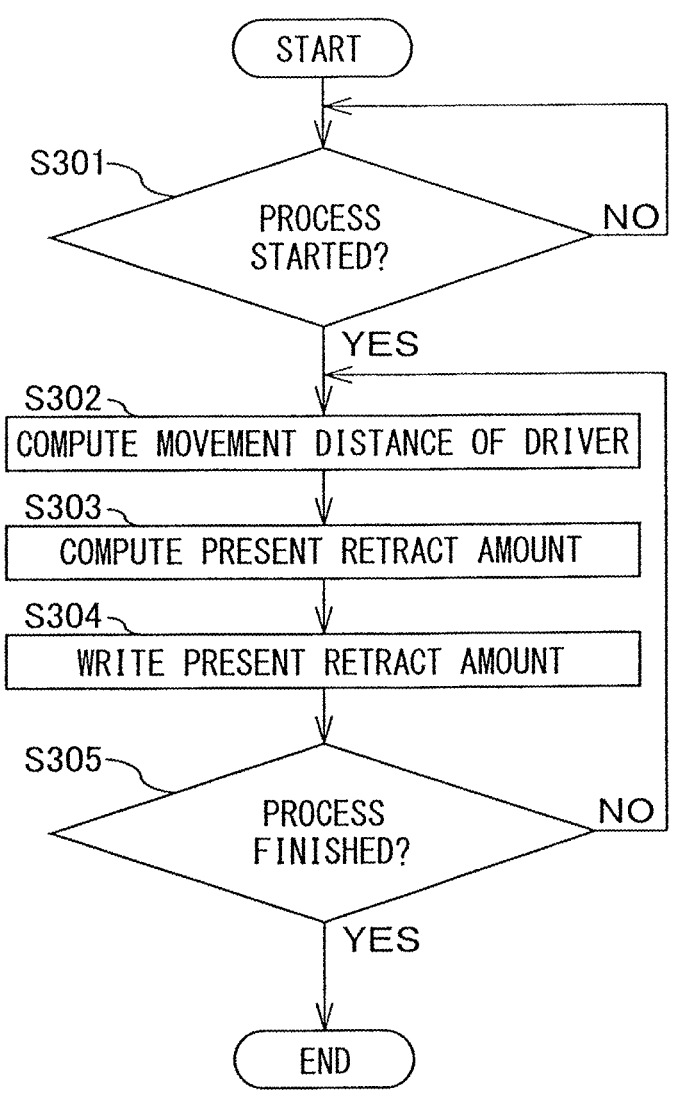
FIG. 8 is a flowchart illustrating a process flow of the motor control system illustrated in FIG. 7.

FIG. 8 is a flowchart illustrating a process flow of the retract amount computing unit 443 in the motor control system 104.

First, in step S301, the retract amount computing unit 443 determines whether a process is started or not. When it is determined that the process is not started, the process returns to step S301. When it is determined that the process is started, the program proceeds to step S302.

When the process proceeds to step S302, the retract amount computing unit 443 computes movement distance L[m] from the movement speed F[m/s] of a workpiece and time T[s] lapsed since the process of the workpiece is started.

Subsequently, in step S303, the retract amount computing unit 443 computes a present retract amount by adding the computed movement distance L[m] to the retract amount selected from the retract amount determination table 4321.

In step S304, by writing the present retract amount computed in step S303 as the first retract amount 251, the retract amount computing unit 443 rewrites the shape or the like of the workpiece to be processed with a retract amount according to a present process state.

In step S305, the retract amount computing unit 443 determines whether the process is finished or not. When it is determined that the process is not finished, the process returns to step S302. The retract amount computing unit 443 repeats the process in steps S302 to S305 until it is determined in step S305 that the process is finished. When it is determined that the process is finished, the flow is terminated.

In the motor control system 104, the retract amount is computed and rewritten in accordance with a process state. Consequently, the retract amount according to a present process state such as the shape or the like of a workpiece to be processed can be used, so that a workpiece being processed can be protected more reliably.

Figure 9:
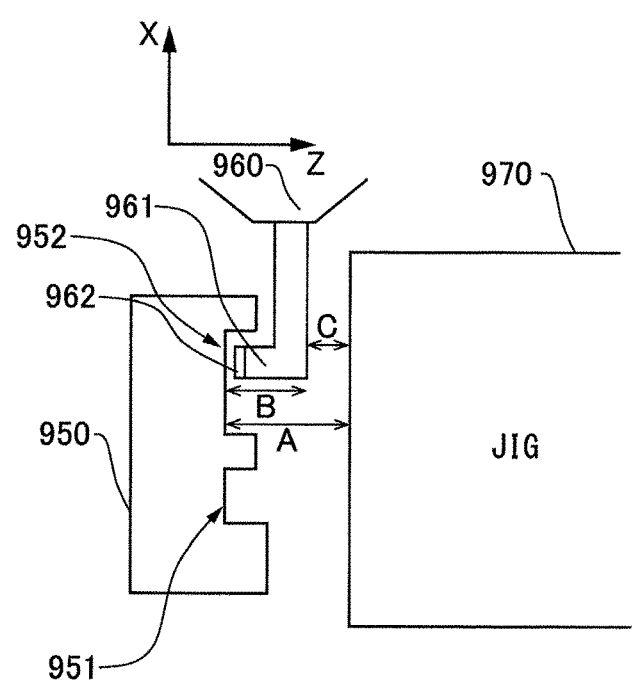
FIG. 9 is a diagram illustrating an example of a process of a machine tool to which the motor control system illustrated in FIG. 7 is applied.

FIG. 9 is a diagram illustrating an example of a process of a machine tool to which the motor control system 104 is applied. More specifically, FIG. 9 is a diagram of cutting the bottom wall of the second recess 952 in the workpiece 950.

A machine tool 960 includes a cutter supporting unit 961 and a cutter 962 disposed at the end of the cutter supporting unit 961 to cut the bottom wall of the recess in the workpiece 950. A jig 970 is disposed for the purpose of fixing of a workpiece and the like. For a retract not causing interference between the jig 970 and the cutter supporting unit 961, a retractable range of the cutter supporting unit 961 is limited. In a process program for cutting the bottom wall of the second recess 952, it is sufficient that a retract amount is shorter than a distance C[m] indicative of the difference between a distance A[m] between the jig and the bottom wall of the second recess 952 and a distance B[m] indicative of the sum of the widths of the cutter supporting unit 961 and the cutter 962. When the cutter 962 cuts while moving in a direction opposite to the jig 970 at the movement speed F[m/s], and when a distance $C_0$[m] indicates the difference between a distance $A_0$[m] between the jig and the bottom wall of the second recess 952 at the start of cutting and a distance $B_0$[m] indicative of the sum of the widths of the cutter supporting unit 961 and the cutter 962, it is sufficient that the retract amount after lapse of time T[s] since the start of the cutting is smaller than a maximum retract amount Y indicated by Equation (2).

$$Y = C_0 + F \times T \qquad \text{Equation (2)}$$

By setting a retract amount at the time of using the process program for cutting the bottom wall of the second recess 952 to a value according to the maximum retract amount Y which increases according to a cutting process, the retract amount can be increased as the cutting process progresses. Consequently, the workpiece 950 can be protected more reliably.

Figure 10:
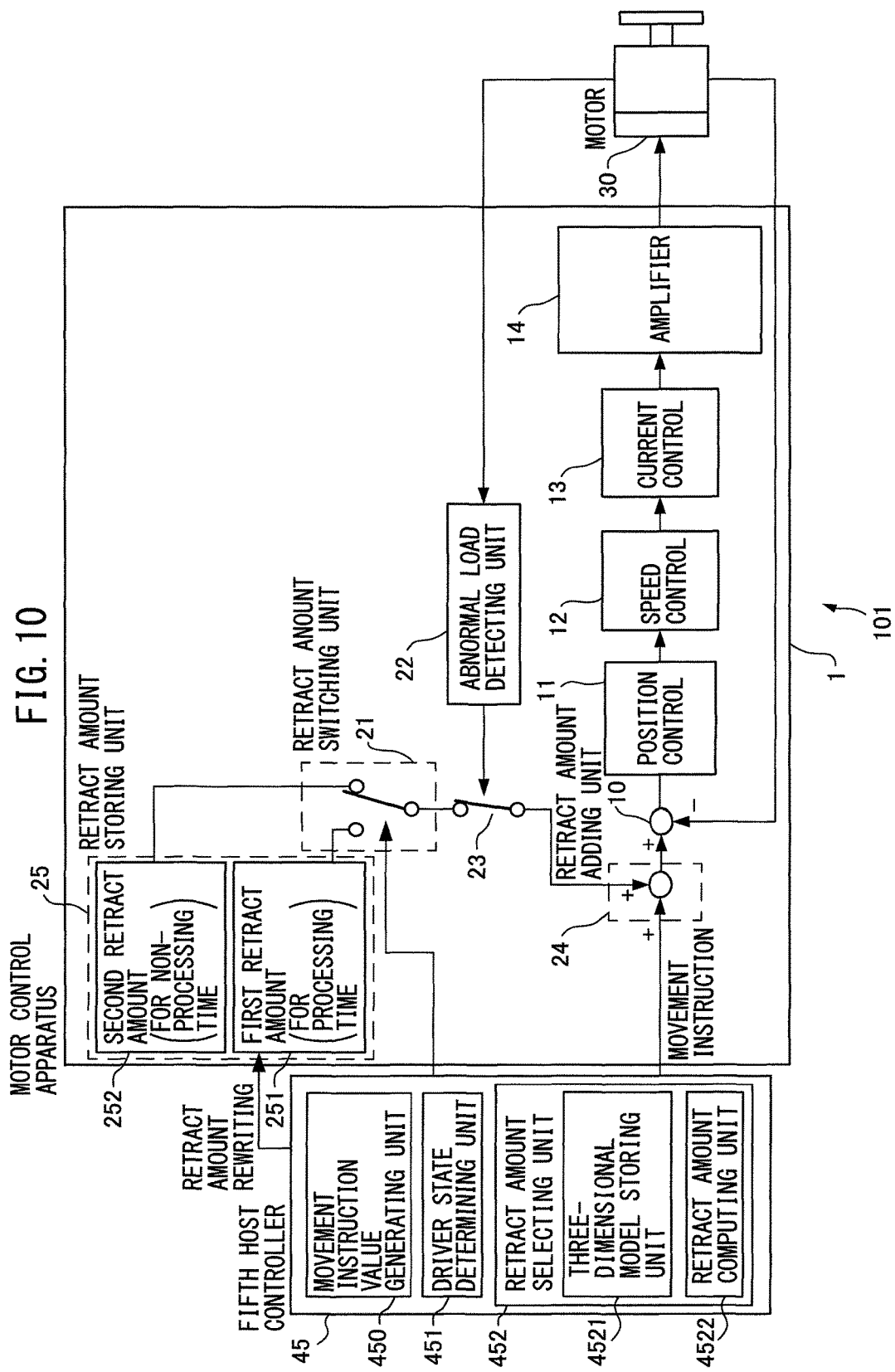
FIG. 10 is a block diagram illustrating a motor control system according to a fifth embodiment.

FIG. 10 is a block diagram illustrating a motor control system including a motor control apparatus according to a fifth embodiment.

A motor control system 105 according to the fifth embodiment is different from the motor control system 103 that a fifth host controller 45 is disposed in place of the third host controller 43.

The fifth host controller 45 includes a movement instruction value generating unit 450, a driver state determining unit 451, and a retract amount determining unit 452. The movement instruction value generating unit 450 and the driver state determining unit 451 have functions similar to those of the movement instruction value generating unit 430 and the driver state determining unit 431, respectively.

The retract amount determining unit 452 includes a three-dimensional model storing unit 4521 and a retract amount computing unit 4522. The three-dimensional model storing unit 4521 stores shape information indicative of shapes of the driver driven by the motor 30, a workpiece disposed in the driver driven by the motor 30, and an object close to the driver driven by the motor 30 such as a jig for fixing a workpiece. The retract amount computing unit 4522 computes the distance between the driver driven by the motor 30 and the object close to the driver driven by the motor 30 from the shape information stored in the three-dimensional model storing unit 4521, the rotational speed of the motor at present, and the like while referring to a program executed in the fifth host controller 45. An example of a computing method of the retract amount computing unit 4522 is described in Japanese Patent Publication No. 5,030,628. The retract amount determining unit 452 determines a retract amount by multiplying the computed distance with a predetermined safety ratio. The retract amount computing unit 4522 writes the computed retract amount as the first retract amount 251. In an example, the retract amount determining unit 452 determines a retract amount by using the shape information indicative of the shapes of the driver driven by the motor 30 and the workpiece disposed in the driver driven by the motor 30, the movement speed of the driver driven by the motor 30, and process time.

Figure 11:
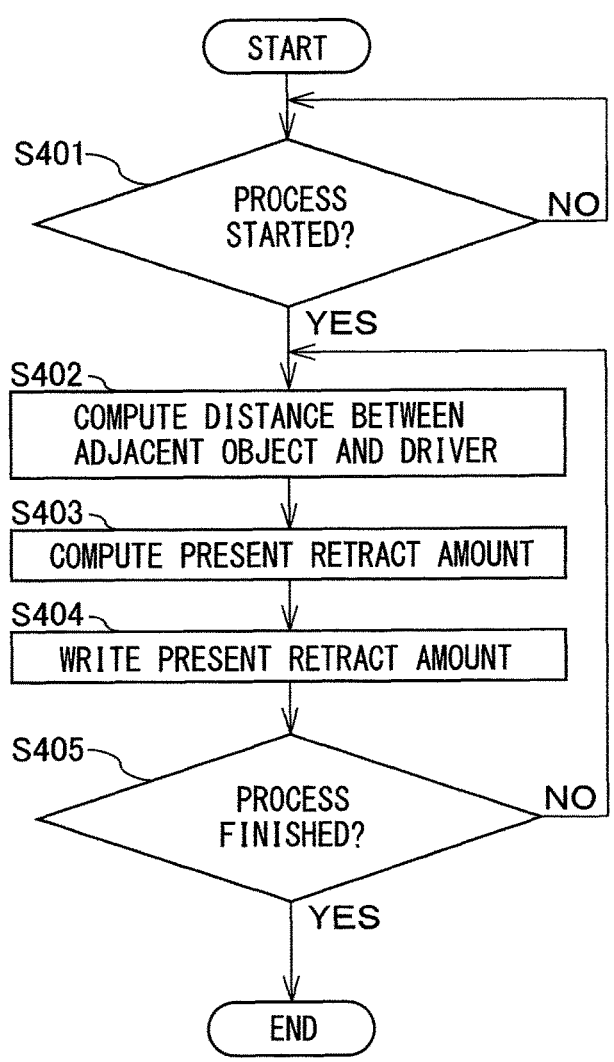
FIG. 11 is a flowchart illustrating a process flow of the motor control system illustrated in FIG. 10.
Figure 13:
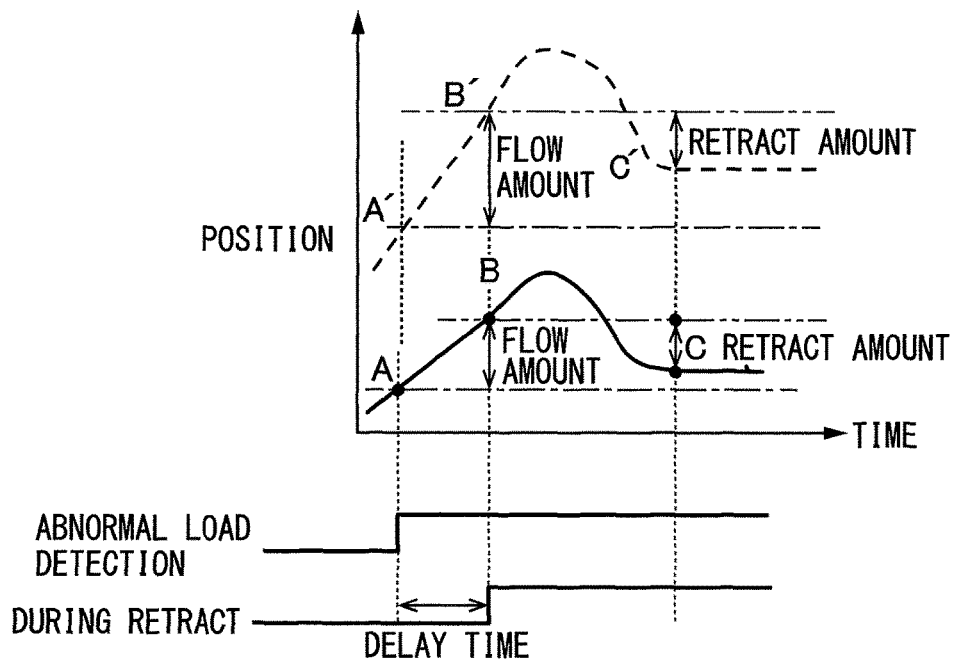
FIG. 13 is a diagram illustrating the relation between the flow amount of movement of a cutter since the machine tool detects a collision until a retract operation is started and the retract amount of retract of the cutter by the retract operation.

FIG. 11 is a flowchart illustrating a process flow of the retract amount determining unit 452 in the motor control system 105.

First, in step S401, the retract amount determining unit 452 determines whether a process is started or not. When it is determined that the process is not started, the process returns to step S401. When it is determined that the process is started, the program proceeds to step S402.

When the process proceeds to step S402, the retract amount determining unit 452 computes the distance between the driver driven by the motor 30 and the object close to the driver driven by the motor 30 from the shape information stored in the three-dimensional model storing unit 4521, the rotational speed of the motor at present, and the like while referring to a program executed in the fifth host controller 45.

Subsequently, in step S403, the retract amount determining unit 452 determines a retract amount by multiplying the computed distance with a predetermined safety ratio.

In step S404, the retract amount determining unit 452 writes the retract amount at present determined in step S403 as the first retract amount 251, thereby rewriting the retract amount to the retract amount according to the present process state.

In step S405, the retract amount determining unit 452 determines whether the process is finished or not. When it is determined that the process is not finished, the process returns to step S402. The retract amount determining unit 452 repeats the process in steps S402 to S405 until it is determined in step S405 that the process is finished. When it is determined that the process is finished, the flow is terminated.

In the motor control system 105, the retract amount is rewritten by using the shape information stored in the three-dimensional model storing unit 4521, the rotational speed of the motor at present, and the like. Consequently, the retract amount according to a present process state can be used, so that a workpiece being processed can be protected more reliably.

In the motor control systems 101 to 105 according to the first to fifth embodiments, the retract amount selected when it is determined that the retract amount switching unit is processing and the retract amount selected when it is determined that the retract amount switching unit is not processing are different from each other. In the motor control systems 101 to 105, since the retract amount selected during process and that during non-process are made different, different protection objects can be protected in such a manner that the tool is protected during no process and a workpiece is protected during process. Specifically, a retract amount for preventing interference with an object to be processed is applied during process, and a retract amount for reducing breakage of the machine tool can be applied during no process.

In the motor control system 102 according to the second embodiment, the retract amount switching unit 21 is switched by using a switch signal generated by the external device 50 on the basis of the status and the like of the devices other than the driver driven by the motor 30. In the motor control system 102, since the retract amount switching unit 21 is switched by using a switch signal generated by the external device 50, the retract amount can be selected on the basis of conditions in a wider range, and the machine tool can be protected more reliably.

The motor control system 103 according to the third embodiment has a function of rewriting a retract amount used during process in accordance with a process program used, so that a workpiece being processed can be protected more reliably.

In the motor control system 104 according to the fourth embodiment, the retract amount is computed and rewritten in accordance with the process state. Consequently, the retract amount according to a present process state can be used, so that a workpiece being processed can be protected more reliably.

In the motor control system 105 according to the fifth embodiment, the retract amount is rewritten in accordance with the distance between the driver driven by the motor 30 and the object close to the driver driven by the motor 30 from the shape information stored in the three-dimensional model storing unit 4521, the motor rotational speed at present, and the like while referring to a program executed in the fifth host controller 45. Consequently, the retract amount according to a present process state can be used, so that a workpiece being processed can be protected more reliably.

The position deviation generating unit 10, the position control unit 11, the speed control unit 12, the current control unit 13, the retract amount switching unit 21, the abnormal load detecting unit 22, the retract amount switch 23, and the retract amount adding unit 24 may be constructed in, for example, a software program form. The position deviation generating unit 10, the position control unit 11, the speed control unit 12, the current control unit 13, the retract amount switching unit 21, the abnormal load detecting unit 22, the retract amount switch 23, and the retract amount adding unit 24 may be constructed by a combination of various electronic circuits and software programs. For example, when constructing the position deviation generating unit 10, the position control unit 11, the speed control unit 12, the current control unit 13, the retract amount switching unit 21, the abnormal load detecting unit 22, the retract amount switch 23, and the retract amount adding unit 24 in a software program form, arithmetic processing apparatuses in the motor control apparatuses 1 and 3 operate in accordance with the software program, thereby realizing the functions of the above-described units. An existing motor control apparatus usually has the functions of the position deviation generating unit 10, the position control unit 11, the speed control unit 12, and the current control unit 13. The present invention can be also applied to the existing motor control apparatus by installing software programs corresponding to the retract amount switching unit 21, the abnormal load detecting unit 22, the retract amount switch 23, and the retract amount adding unit 24 to the motor control apparatus.

In the motor control systems 101 to 105, whether the load of the motor 30 is abnormal or not is determined in step S101 and, after that, the retract amount switching unit 21 switches the retract amount in steps S102 to S104. However, in the motor control system according to the present invention, before whether the load of the motor 30 is abnormal or not is determined, the retract amount switching unit 21 may switch the retract amount. The retract amount storing unit 20 may store three or more retract amounts. When the retract amount storing unit 20 stores three or more retract amounts, the retract amount switching unit 21 is formed to select any one retract amount from the three or more retract amounts. For example, the retract amount storing unit 20 may store a retract amount according to a process program used. Although the abnormal load detecting unit 22 detects an abnormal load by using motor current information detected by the motor current detector, an abnormal load may be detected by using information indicative of the rotational speed of the motor 30 or information indicative of a rotation torque.

In the motor control system 104, the first retract amount 251 used during process is rewritten in accordance with the movement speed F[m/s] of the driver. Alternatively, the retract amount may be rewritten in accordance with a process state of a workpiece by using another parameter. For example, the fourth host controller 44 prepares a parameter in advance, and a step of reading the prepared parameter as a retractment amount during a process program may be provided. During a process program, according to a plurality of processes executed on the basis of the process program, a plurality of retractment amounts may be prepared for each of the processes. By having a retractment amount determined by executing a process simulation based on a process program, the fourth host controller 44 may rewrite a retractment amount in accordance with the processing shape. The first retractment amount 251 may be rewritten not by the fourth host controller 44 but from another apparatus.

The configuration of the above-described motor control apparatuses 101 to 105 may perform switching by a setting of the high-order motor and the motor control apparatus.

According to the present invention, the retract amount selected when it is determined that processing is being made and the retract amount selected when it is determined that processing is not being made are different from each other. Consequently, different protection objects such as a machine during non-processing and a workpiece during processing can be protected.

Since a retract amount to be selected is switched in accordance with a switch signal input from an external device, a retract amount can be selected on the basis of conditions in a wider range, and a machine tool can be protected more reliably.

Since a retract amount selected when it is determined that the machine tool is processing is rewritten in accordance with a process program used, a retract amount adapted to a processing program used can be set.

The retract amount selected when it is determined that the machine tool is processing is rewritten in accordance with a process state of a workpiece which is processed by the machine tool, so that the retract amount adapted to the shape of a workpiece to be processed can be set.

What is claimed is:

1. A motor control apparatus controlling a motor driving a machine tool, the machine tool having two modes of operation: a processing mode and a non-processing mode, the motor control apparatus comprising:
   an abnormal load detecting unit that detects an abnormal load by monitoring a load of the motor;
   a retract amount storing unit that stores a plurality of retract amounts used when the machine tool retracts in response to detection of an abnormal load by the abnormal load detecting unit;
   a retract amount switching unit that selects a retract amount from the plurality of retract amounts in accordance with a result of determination of whether the machine tool is operating in the processing mode or the non-processing mode; and
   a retract amount adding unit that adds a retract amount selected by switching of the retract amount switching unit to an instruction value indicative of a movement amount of the machine tool.

2. The motor control apparatus according to claim 1, wherein the retract amount switching unit switches a retract amount to be selected in accordance with a mode signal input from a host controller indicating whether the machine tool is operating in the processing mode or the non-processing mode.

3. The motor control apparatus according to claim 1, wherein the retract amount switching unit selects a retract amount in accordance with a switch signal input from an external device.

4. The motor control apparatus according to claim 1, wherein a retract amount selected when it is determined that the machine tool is operating in the processing mode is rewritten in accordance with a process program used.

5. The motor control apparatus according to claim 1, wherein a retract amount selected when it is determined that the machine tool is operating in the processing mode is rewritten in accordance with a process state of a workpiece processed by the machine tool.

* * * * *